United States Patent
Kohzuki et al.

(10) Patent No.: US 9,879,144 B2
(45) Date of Patent: Jan. 30, 2018

(54) CLEANING SOLUTION, SET OF INK AND CLEANING SOLUTION, CLEANING METHOD, CLEANING APPARATUS, PRINTING METHOD, AND PRINTING APPARATUS

(71) Applicants: Shizuka Kohzuki, Kanagawa (JP);
 Akiko Bannai, Kanagawa (JP)

(72) Inventors: Shizuka Kohzuki, Kanagawa (JP);
 Akiko Bannai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/454,599

(22) Filed: Mar. 9, 2017

(65) Prior Publication Data
US 2017/0267879 A1 Sep. 21, 2017

(30) Foreign Application Priority Data

Mar. 16, 2016 (JP) .................................. 2016-053030
Oct. 27, 2016 (JP) .................................. 2016-210887
Mar. 3, 2017 (JP) .................................. 2017-040277

(51) Int. Cl.
*B41J 2/165* (2006.01)
*C09D 9/00* (2006.01)
(Continued)

(52) U.S. Cl.
CPC .......... *C09D 9/005* (2013.01); *B41J 2/16552* (2013.01); *C09D 9/04* (2013.01); *C09D 11/54* (2013.01); *B41J 2002/16558* (2013.01)

(58) Field of Classification Search
CPC ...... C09D 11/30; C09D 11/033; B41J 2/1652; B41J 2/16552; B41J 2002/16558; B41J 2/165; B41J 2/16517
See application file for complete search history.

(56) References Cited

U.S. PATENT DOCUMENTS 8,530,400 B2 * 9/2013 Seki .................... B41J 2/16552
 134/38
2007/0225185 A1 * 9/2007 Kasai .................. B41J 2/16552
 510/170

(Continued)

FOREIGN PATENT DOCUMENTS

JP 4872781 12/2011
JP 2013-132753 7/2013
(Continued)

*Primary Examiner* — Huan Tran
(74) *Attorney, Agent, or Firm* — Oblon, McClelland, Maier & Neustadt, L.L.P.

(57) ABSTRACT

Provided is cleaning solution used for cleaning ink containing water and resin, cleaning solution containing water and solvent. Solvent contains glycol ether compound represented by general formula 1. Ink film obtained by drying the ink has swelling ratio of 20 percent or higher but 150 percent or lower, where swelling ratio is calculated by mathematical formula 1 based on masses of ink film before/after immersed in cleaning solution at 25 degrees C. for 24 hours,

$$R^1(OR^2)_xOR^3 \quad \text{General formula 1}$$

In general formula 1, $R^1$ and $R^3$ represent hydrogen atom or alkyl group including from 1 through 4 carbon atoms, $R^2$ represents alkyl group including from 2 through 3 carbon atoms, and X represents integer of from 1 through 4, $$\text{Swelling ratio}(\%)=100\times[(B-A)/A] \quad \text{Mathematical formula 1}$$

In mathematical formula 1, A represents mass of ink film before immersed, and B represents mass of ink film after immersed.

11 Claims, 3 Drawing Sheets

(51) Int. Cl.
*C09D 9/04* (2006.01)
*C09D 11/54* (2014.01)

(56) References Cited

U.S. PATENT DOCUMENTS

| | | |
|---|---|---|
| 2010/0126529 A1 | 5/2010 | Seki et al. |
| 2013/0194345 A1 | 8/2013 | Tamai et al. |
| 2014/0085376 A1* | 3/2014 | Kato .................. B41J 2/16552 347/33 |
| 2015/0361282 A1 | 12/2015 | Nakagawa et al. |

FOREIGN PATENT DOCUMENTS

| | | |
|---|---|---|
| JP | 2013-158918 | 8/2013 |
| JP | 2014-198824 | 10/2014 |
| JP | 2015-174231 | 10/2015 |

* cited by examiner

CLEANING SOLUTION, SET OF INK AND CLEANING SOLUTION, CLEANING METHOD, CLEANING APPARATUS, PRINTING METHOD, AND PRINTING APPARATUS

CROSS-REFERENCE TO RELATED APPLICATIONS

The present application claims priority under 35 U.S.C. § 119 to Japanese Patent Application No. 2016-053030, filed Mar. 16, 2016, Japanese Patent Application No. 2016-210887, filed Oct. 27, 2016, and Japanese Patent Application No. 2017-040277, filed Mar. 3, 2017. The contents of which are incorporated herein by reference in their entirety.

BACKGROUND OF THE INVENTION

Field of the Invention

The present disclosure relates to a cleaning solution, a set of an ink and a cleaning solution, a cleaning method, a cleaning apparatus, a printing method, and a printing apparatus.

Description of the Related Art

Hitherto, dye inks have been the mainstream among inkjet inks owing to, for example, a good chromogenicity and a high reliability. Recently, however, it has become more common to use pigment inks, because the dye inks are poor in water resistance and light resistance.

Inkjet printing using the pigment inks has come to be used also in commercial printing using, for example, high-speed continuous feed printers. In such commercial printing, image qualities comparable to image qualities obtained by existing offset printing are demanded even on coated paper for printing having a low ink absorbability as print media.

Inks need to contain resins in order to secure a high-speed drying property (high-speed fixability) and fixability on lowly ink-absorbable media, which the inks need to have in order to be used in the high-speed continuous feed printers.

However, because inks containing the resins firmly adhere to ink discharging heads, existing cleaning solutions are insufficient in cleaning power, and it is difficult to secure ink discharging reliability.

Hence, there is proposed a cleaning solution for inks containing resin particles in an amount of 0.1 percent by mass or greater but 50 percent by mass or less of the inks (see, e.g., Japanese Unexamined Patent Application Publication No. 2013-158918).

There is also proposed a technique for obtaining a coating film of an ink excellent in scratch resistance by adding a resin having a high Martens hardness in the ink as resin particles (see, e.g., Japanese Unexamined Patent Application Publication No. 2014-198824).

There is also proposed a maintenance method for cleaning a discharging surface of an ink head with a cloth impregnated with a cleaning solution in order to improve a maintenance property (see, e.g., Japanese Unexamined Patent Application Publication No. 2013-132753).

There is also proposed an inkjet printer maintenance liquid containing at least one selected from the group consisting of glycol ethers and glycol esters in an amount of 80 percent by mass or greater of the maintenance liquid (see, e.g., Japanese Patent No. 4872781).

SUMMARY OF THE INVENTION

According to one aspect of the present disclosure, a cleaning solution is a cleaning solution used for cleaning an ink containing water and a resin. The cleaning solution contains water and a solvent. The solvent contains a glycol ether compound represented by general formula 1 below. An ink film obtained by drying the ink has a swelling ratio of 20 percent or higher but 150 percent or lower, where the swelling ratio is calculated according to mathematical formula 1 below based on masses of the ink film before and after the ink film is immersed in the cleaning solution at 25 degrees C. for 24 hours.

$$R^1(OR^2)_xOR^3 \qquad \text{General formula 1}$$

In general formula 1, $R^1$ and $R^3$ represent any one of a hydrogen atom and an alkyl group containing from 1 through 4 carbon atoms, $R^2$ represents an alkyl group containing from 2 through 3 carbon atoms, and X represents an integer of from 1 through 4.

$$\text{Swelling ratio}(\%) = 100 \times [(B-A)/A] \qquad \text{Mathematical formula 1}$$

In mathematical formula 1, A represents the mass of the ink film before immersed, and B represents the mass of the ink film after immersed.

DESCRIPTION OF THE EMBODIMENTS (Cleaning Solution)

A cleaning solution of the present disclosure is a cleaning solution used for cleaning an ink containing water and a resin.

The cleaning solution contains water and a solvent.

The solvent contains a glycol ether compound represented by general formula 1 below.

An ink film obtained by drying the ink has a swelling ratio of 20 percent or higher but 150 percent or lower, where the swelling ratio is calculated according to mathematical formula 1 below based on masses of the ink film before and after the ink film is immersed in the cleaning solution at 25 degrees C. for 24 hours. The cleaning solution further contains other components as needed.

$$R^1(OR^2)_xOR^3 \qquad \text{General formula 1}$$

In general formula 1, $R^1$ and $R^3$ represent any one of a hydrogen atom and an alkyl group containing from 1 through 4 carbon atoms, $R^2$ represents an alkyl group containing from 2 through 3 carbon atoms, and X represents an integer of from 1 through 4.

$$\text{Swelling ratio}(\%) = 100 \times [(B-A)/A] \qquad \text{Mathematical formula 1}$$

In mathematical formula 1, A represents the mass of the ink film before immersed, and B represents the mass of the ink film after immersed.

The cleaning solution of the present disclosure is based on a finding that the cleaning solution and the maintenance method described in Japanese Unexamined Patent Application Publication No. 2013-158918 and Japanese Unexamined Patent Application Publication No. 2013-132753 mentioned above cannot secure a sufficient cleanability with respect to the ink that is described in Japanese Unexamined Patent Application Publication No. 2014-198824 mentioned above and that is improved in a drying property and fixability but instead becomes particularly difficult to remove when it stains.

The cleaning solution of the present disclosure is also based on a finding that the inkjet printer maintenance liquid described in Japanese Patent No. 4872781 mentioned above and containing at least one selected from the group consisting of glycol ethers and glycol esters in an amount of 80 percent by mass or greater of the maintenance liquid makes an adhered matter of an ink adhering on a discharging surface of a head more firmly adhere to the nozzle surface if the ink remains unremoved by cleaning.

The present disclosure has an object to provide a cleaning solution having a sufficient cleaning power and capable of ensuring a good discharging reliability.

The present disclosure can provide a cleaning solution having a sufficient cleaning power and capable of ensuring a good discharging reliability.

A swelling ratio of an ink film obtained by drying the ink is preferably 20 percent or higher but 150 percent or lower, and the lower limit of the swelling ratio is preferably 50 percent or higher and more preferably 58 percent or higher. The swelling ratio is calculated according to mathematical formula 1 below based on masses of the ink film before and after the ink film is immersed in the cleaning solution at 25 degrees C. for 24 hours.

When the swelling ratio in the cleaning solution is 20 percent or higher but 150 percent or lower, it is possible to swell the ink film.

$$\text{Swelling ratio}(\%) = 100 \times [(B-A)/A] \quad \text{Mathematical formula 1}$$

In mathematical formula 1, A represents the mass of the ink film before immersed, and B represents the mass of the ink film after immersed.

The degree of film swelling of the ink film in the cleaning solution can be obtained in the manner described below.

The ink is dropped into a Teflon (registered trademark) petri dish (with a diameter of 30 mm) and dried in a thermostat bath of 50 degrees C. for 1 clay, to produce an ink film having an average thickness after dried of 1 mm.

The produced ink film is cut out into a size of 5 mm×5 mm, and then the mass of the cut-out ink film is measured. The cut-out ink film is put in a 5 mL glass bottle, and the cleaning solution (1 g) is poured into the glass bottle to immerse the ink film. The ink film is left to stand in the glass bottle in a hermetically sealed state at 25 degrees C. for 24 hours.

After left to stand at 25 degrees C. for 24 hours, the ink film is taken out from the glass bottle, and the surface of the ink film is wiped with KIMWIPES to a degree that the cleaning solution on the surface can no longer be visually recognized. Then, the mass of the ink film is measured. The swelling ratio can be calculated according to mathematical formula 1.

The cleaning solution of the present disclosure contains water and a solvent, preferably contains a surfactant, and further contains other components as needed.

<Solvent>

The solvent contains a glycol ether compound represented by general formula 1 and further contains any other solvent as needed.

The glycol ether compound represented by general formula 1 has a stronger force of acting on an ink film than other solvents, and can hence improve cleanability.

$$R^1(OR^2)_xOR^3 \quad \text{General formula 1}$$

In general formula 1, $R^1$ and $R^3$ represent any one of a hydrogen atom and an alkyl group containing from 1 through 4 carbon atoms. Examples of the alkyl group containing from 1 through 4 carbon atoms include a methyl group, an ethyl group, a propyl group, and a butyl group.

In general formula 1, $R^2$ represents an alkyl group containing from 2 through 3 carbon atoms. Examples of the alkyl group containing from 2 through 3 carbon atoms include an ethyl group and a propyl group.

X represents an integer of from 1 through 4.

Examples of the glycol ether compound represented by general formula 1 include; glycols such as ethylene glycol, diethylene glycol, triethylene glycol, propylene glycol, and dipropylene glycol; and glycol ethers such as ethylene glycol monobutyl ether, propylene glycol monomethyl ether, propylene glycol monobutyl ether, diethylene glycol monoethyl ether, diethylene glycol diethyl ether, diethylene glycol monobutyl ether, diethylene glycol dibutyl ether, diethylene glycol methylethyl ether, dipropylene glycol monomethyl ether, dipropylene glycol monoethyl ether, dipropylene glycol monobutyl ether, propylene glycol n-propyl ether, triethylene glycol monomethyl ether, triethylene glycol monoethyl ether, triethylene glycol monobutyl ether, tripropylene glycol monomethyl ether, tetraethylene glycol dimethyl ether, and tetraethylene glycol diethyl ether. One of these glycol ether compounds may be used alone or two or more of these glycol ether compounds may be used in combination.

Among these glycol ether compounds, diethylene glycol monobutyl ether, diethylene glycol diethyl ether, triethylene glycol monobutyl ether, and tripropylene glycol monomethyl ether are preferable.

The proportion of the glycol ether compound represented by general formula 1 is preferably 30 percent by mass or greater but 70 percent by mass or less and more preferably 45 percent by mass or greater but GO percent by mass or less of the total amount of the cleaning solution. When the proportion of the glycol ether compound is 30 percent by mass or greater, an ink film can be swelled to a wipeable level. When the proportion of the glycol ether compound is 70 percent by mass or less, an ink film does not swell excessively and can be wiped off cleanly from the interface between a nozzle surface and ink stains.

<Any Other Solvent>

The any other solvent is not particularly limited and may be appropriately selected depending on the intended purpose. Examples of the any other solvent include water-soluble organic solvents and polyol compounds containing from 8 through 11 carbon atoms.

Examples of the water-soluble organic solvents include polyols, ethers such as polyol alkyl ethers and polyol aryl ethers, nitrogen-containing heterocyclic compounds, amides, amines, and sulfur-containing compounds.

Examples of the water-soluble organic solvents include: polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethylpropionamide, and 3-butoxy-N,N-dimethylpropionamide; amines such as monoethanolamine, diethanolamine, and triethylamine; sulfur-containing compounds such as dimethylsulfoxide, sulfolane, and thiodiethanol; propylene carbonate; and ethylene carbonate. One of these water-soluble organic solvents may be used alone or two or more of these water-soluble organic solvents may be used in combination.

Examples of the polyol compounds containing from 8 through 11 carbon atoms include 2-ethyl-1,3-hexanediol and 2,2,4-trimethyl-1,3-pentanediol.

<Water>

The water is not particularly limited and may be appropriately selected depending on the intended purpose. Examples of the water include: pure water such as ion-exchanged water, ultrafiltrated water, reverse osmotic water, and distilled water; and ultrapure water.

The proportion of the water is not particularly limited, may be appropriately selected depending on the intended purpose, and is preferably 20 percent by mass or greater but 80 percent by mass or less and more preferably 30 percent by mass or greater but 70 percent by mass or less of the total amount of the cleaning solution. When the proportion of the water is 20 percent by mass or greater but 80 percent by mass or less, an ink film can be wiped off cleanly from the interface between a nozzle surface and ink stains.

<Surfactant>

The surfactant may be any of a silicone-based surfactant, a fluorosurfactant, an amphoteric surfactant, a nonionic surfactant, and an anionic surfactant.

The silicone-based surfactant is not particularly limited and may be appropriately selected depending on the intended purpose. Among silicone-based surfactants, silicone-based surfactants that do not decompose even at a high pH are preferable. Examples of such silicone-based surfactants include side-chain-modified polydimethylsiloxane, both-end-modified polydimethylsiloxane, one-end-modified polydimethylsiloxane, and side-chain-both-end-modified polydimethylsiloxane. Silicone-based surfactants containing a polyoxyethylene group or a polyoxyethylene polyoxypropylene group as a modifying group are particularly preferable because such silicone-based surfactants demonstrate good characteristics as aqueous surfactants. Polyether-modified silicone-based surfactants may also be used as the silicone-based surfactant. Examples of polyether-modified silicone-based surfactants include compounds in which a polyalkylene oxide structure is introduced into a side chain of the Si site of dimethylsiloxane.

As the fluorosurfactant, for example, perfluoroalkylsulfonic acid compounds, perfluoroalkylcarboxylic acid compounds, perfluoroalkylphosphoric acid ester compounds, perfluoroalkyl-ethylene oxide adducts, and polyoxyalkylene ether polymer compounds containing a perfluoroalkyl ether group in a side chain are particularly preferable because these fluorosurfactants have a low foaming property. Examples of the perfluoroalkylsulfonic acid compounds include perfluoroalkylsulfonic acid and perfluoroalkyl sulfonates. Examples of the perfluoroalkylcarboxylic acid compounds include perfluoroalkylcarboxylic acid and perfluoroalkyl carboxylates. Examples of the polyoxyalkylene ether polymer compounds containing a perfluoroalkyl ether group in a side chain include sulfates of polyoxyalkylene ether polymers containing a perfluoroalkyl ether group in a side chain and salts of polyoxyalkylene ether polymers containing a perfluoroalkyl ether group in a side chain. Examples of counter ions of the salts among these fluorosurfactants include Li, Na, K, $NH_4$, $NH_3CH_2CH_2OH$, $NH_2(CH_2CH_2OH)_2$, and $NH(CH_2CH_2OH)_3$.

Examples of the amphoteric surfactant include laurylaminopropionates, lauryldimethyl betaine, stearyldimethyl betaine, and lauryl dihyroxyethyl betaine.

Examples of the nonionic surfactant include polyoxyethylene alkylphenyl ethers, polyoxyethylene alkyl esters, polyoxyethylene alkylamines, polyoxyethylene alkylamides, polyoxyethylene propylene block polymers, sorbitan fatty acid esters, polyoxyethylene sorbitan fatty acid esters, and acetylene alcohol-ethylene oxide adducts.

Examples of the nonionic surfactant include polyoxyethylene alkyl ether acetates, dodecylbenzene sulfonates, laurates, and salts of polyoxyethylene alkyl ether sulfates.

One of these surfactants may be used alone or two or more of these surfactants may be used in combination.

The silicone-based surfactants have no particular limit and can be suitably selected to suit to a particular application. Specific examples thereof include, but are not limited to, side-chain-modified polydimethyl siloxane, both end-modified polydimethylsiloxane, one-end-modified polydimethylsiloxane, and side-chain-both-end-modified polydimethylsiloxane. In particular, a polyether-modified silicone-based surfactant having a polyoxyethylene group or a polyoxyethylene polyoxypropylene group as a modifying group is particularly preferable because such a surfactant demonstrates good characteristics as an aqueous surfactant.

Any suitably synthesized surfactant and any product thereof available on the market is suitable. Products available on the market are obtained from Byk Chemie Japan Co., Ltd., Shin-Etsu Chemical Co., Ltd., Dow Corning Toray Silicone Co., Ltd., NIHON EMULSION Co., Ltd., Kyoeisha Chemical Co., Ltd., etc.

The polyether-modified silicone-based surfactant has no particular limit and can be suitably selected to suit to a particular application. Examples thereof include a compound in which the polyalkylene oxide structure represented by the following general formula S-1 is introduced into the side chain of the Si site of dimethyl polysiloxane.

General formula S-1

$X = -R(C_2R_4O)_a(C_3H_6O)_b R'$

In general formula S-1, "m", "n", "a", and "b" each, respectively represent integers, R represents an alkylene group, and R' represents an alkyl group.

Products available on the market may be used as the polyether-modified silicone-based surfactants. Specific examples of the products available on the market include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Silicone Co., Ltd.), BYK-33 and BYK-387 (both manufactured by Byk Chemie Japan Co., Ltd.), and TSF4440, TSF4452, and TSF4453 (all manufactured by Toshiba Silicone Co., Ltd.).

<Other Components>

The other components are not particularly limited and may be appropriately selected depending on the intended purpose. Examples of the other components include a defoaming agent, a preservative and fungicide, a corrosion inhibitor, and a pH regulator.

<Defoaming Agent>

The defoaming agent has no particular limit. For example, silicon-based defoaming agents, polyether-based defoaming agents, and aliphatic acid ester-based defoaming agents are suitable. These defoaming agents can be used alone or in combination. Of these defoaming agents, silicone-based defoaming agents are preferable to easily break foams.

<Preservatives and Fungicides>

The preservatives and fungicides are not particularly limited. A specific example is 1,2-benzisothiazolin-3-on.

<Corrosion Inhibitor>

The corrosion inhibitor has no particular limit Examples thereof are acid sulfite and sodium thiosulfate.

<pH Regulator>

The pH regulator has no particular limit. It is preferable to adjust the pH to 7 or higher. Specific examples thereof include, but are not limited to, amines such as diethanol amine and triethanol amine.

(Set of Ink and Cleaning Solution)

A set of an ink and a cleaning solution of the present disclosure is a set of an ink and a cleaning solution including an ink and a cleaning solution.

The ink contains water and a resin.

The cleaning solution contains water and a solvent.

The solvent contains a glycol ether compound represented by general formula 1 below.

An ink film obtained by drying the ink has a swelling ratio of 20 percent or higher but 150 percent or lower, where the swelling ratio is calculated according to mathematical formula 1 below based on masses of the ink film before and after the ink film is immersed in the cleaning solution at 25 degrees C. for 24 hours.

$$R^1(OR^2)_xOR^3 \qquad \text{General formula 1}$$

In general formula 1, $R^1$ and $R^3$ represent any one of a hydrogen atom and an alkyl group containing from 1 through 4 carbon atoms, $R^2$ represents an alkyl group containing from 2 through 3 carbon atoms, and X represents an integer of from 1 through 4.

$$\text{Swelling ratio(\%)}=100\times[(B-A)/A] \qquad \text{Mathematical formula 1}$$

In mathematical formula 1, A represents the mass of the ink film before immersed, and B represents the mass of the ink film after immersed.

The cleaning solution of the present disclosure is used as the cleaning solution included in the set of an ink and a cleaning solution of the present disclosure.

The ink included in the set of an ink and a cleaning solution of the present disclosure contains water and a resin, preferably contains an organic solvent and a coloring material, and further contains other components as needed.

<Resin>

The type of the resin contained in the ink has no particular limit and can be suitably selected to suit to a particular application. Specific examples thereof include, but are not limited to, urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

Particles of such resins may be also used. It is possible to mix a resin emulsion in which the resin particles are dispersed in water serving as a dispersion medium with materials such as a coloring material and an organic solvent to obtain ink. The resin particle can be synthesized or is available on the market. It is possible to synthesize the resin particle or obtain from market. These can be used alone or in combination of the resin particles.

The volume average particle diameter of the resin particle is not particularly limited and can be suitably selected to suit to a particular application. The volume average particle diameter is preferably from 10 through 1,000 nm, more preferably from 10 through 200 nm, and furthermore preferably from 10 through 100 nm to obtain good fixability and image hardness.

The volume average particle diameter can be measured by using a particle size analyzer (Nanotrac Wave-UT151, manufactured by MicrotracBEL Corp.).

The particle diameter of the solid portion in ink has no particular limit and can be suitably selected to suit to a particular application. For example, the maximum frequency in the maximum number conversion is preferably from 20 through 1,000 nm and more preferably from 20 through 150 nm to ameliorate the discharging stability and image quality such as image density. The solid portion includes resin particles, particles of pigments, etc. The particle diameter of the solid portion can be measured by using a particle size analyzer (Nanotrac Wave-UT151, manufactured by MicrotracBEL Corp).

The proportion of the resin is preferably 5 percent by mass or greater, more preferably 5 percent by mass or greater but 30 percent by mass or less, and more preferably 5 percent by mass or greater but 20 percent by mass or less of the total amount of the ink in terms of fixability and storage stability of the ink.

<Organic Solvent>

There is no specific limitation on the type of the organic solvent used in the present disclosure. For example, water-soluble organic solvents are suitable. Specific examples thereof include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

Since the water-soluble organic solvent serves as a humectant and also imparts a good drying property, it is preferable to use an organic solvent having a boiling point of 250 degrees C. or lower.

<Coloring Material>

The coloring material has no particular limit. For example, pigments and dyes are suitable.

The pigment includes inorganic pigments and organic pigments. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black. Of these pigments, pigments having good affinity with solvents are preferable. Also, hollow resin particles and inorganic hollow particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4 (Phthalocyanine Blue), 16, 17:1, 56, 60, and 63; and C.I. Pigment Green 1, 4, 7, 8, 10, 17, 18, and 36.

The type of dye is not particularly limited and includes, for example, acidic dyes, direct dyes, reactive dyes, and basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in ink is preferably from 0.1 through 15 percent by mass and more preferably from 1 through 10 percent by mass in terms of enhancement of image density, fixability, and discharging stability.

To obtain the ink, the pigment is dispersed by, for example, preparing a self-dispersible pigment by introducing a hydrophilic functional group into the pigment, coating the surface of the pigment with resin, or using a dispersant.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of the pigment with resin, the pigment is encapsulated by microcapsules to make the pigment dispersible in water. This can be referred to as a resin-coated pigment. In this case, the pigment to be added to ink is not necessarily wholly coated with resin. Pigments partially or wholly uncovered with resin may be dispersed in the ink unless the pigments have an adverse impact.

To use a dispersant, for example, a known dispersant of a small molecular weight type or a high molecular weight type represented by a surfactant is used to disperse the pigments in ink.

As the dispersant, it is possible to use, for example, anionic surfactants, cationic surfactants, amphoteric surfactants, nonionic surfactants, etc. depending on the pigments.

Also, a nonionic surfactant (RT-100, manufactured by TAKEMOTO OIL & FAT CO., LTD.) and a formalin condensate of naphthalene sodium sulfonate are suitable as dispersants.

These dispersants can be used alone or in combination.

<Pigment dispersion>

The ink can be obtained by mixing a coloring material with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by dispersing water, pigment, pigment dispersant, and other optional components and adjusting the particle diameter. It is good to use a dispersing device for dispersion.

The particle diameter of the pigment in the pigment dispersion has no particular limit. For example, the maximum frequency in the maximum number conversion is preferably from 20 through 500 nm and more preferably from 20 through 150 nm to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 through 50 percent by mass and more preferably from 0.1 through 30 percent by mass.

During the production, coarse particles are optionally filtered off from the pigment dispersion with a filter, a centrifuge, etc. preferably followed by degassing.

<Additive>

Ink may further optionally contain a surfactant, a defoaming agent, a preservative and fungicide, a corrosion inhibitor, a pH regulator, etc.

<Surfactant>

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application. Of silicone-based surfactants, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group as a modifying group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These fluoro surfactants are particularly preferable because these fluoro surfactants do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These surfactants can be used alone or in combination.

The proportion of the surfactant in ink is not particularly limited and can be suitably selected to suit to a particular application. It is preferably from 0.001 through 5 percent by mass and more preferably from 0.05 through 5 percent by mass in terms of excellent wettability and discharging stability and improvement on image quality.

<Defoaming Agent>

The defoaming agent has no particular limit. For example, silicon-based defoaming agents, polyether-based defoaming agents, and aliphatic acid ester-based defoaming agents are suitable. These defoaming agents can be used alone or in combination. Of these defoaming agents, silicone-based defoaming agents are preferable to easily break foams.

<Preservatives and Fungicides>

The preservatives and fungicides are not particularly limited. A specific example is 1,2-benzisothiazolin-3-on.

<Corrosion Inhibitor>

The corrosion inhibitor has no particular limit. Examples thereof are acid sulfite and sodium thiosulfate.

<pH Regulator>

The pH regulator has no particular limit. It is preferable to adjust the pH to 7 or higher. Specific examples thereof include, but are not limited to, amines such as diethanol amine and triethanol amine.

The property of the ink is not particularly limited and can be suitably selected to suit to a particular application. For example, viscosity, surface tension, pH, etc., are preferably in the following ranges.

The viscosity of the ink at 25 degrees C. is preferably from 5 through 30 mPa·s and more preferably from 5 through 25 mPa·s to improve print density and text quality and obtain good dischargeability. The viscosity can be measured by, for example, a rotatory viscometer (RE-80L, manufactured by TORT SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably levelized on a print medium and the drying time of the ink is shortened.

The pH of the ink is preferably from 7 through 12 and more preferably from 8 through 11 in terms of prevention of corrosion of metal materials contacting the ink.

<Print Medium>

The print medium for use in printing is not particularly limited. Specific examples thereof include, but are not limited to, plain paper, gloss paper, special paper, cloth, film, OHP sheets, printing paper for general purpose.

(Cleaning Method and Cleaning Apparatus)

A cleaning method of the present disclosure is a cleaning method for cleaning a nozzle surface of an ink discharging head and includes:

a step (hereinafter may be referred to as "cleaning solution delivering step") of delivering a cleaning solution to a wiping member present on a press member; and a step (hereinafter may be referred to as "wiping step") of wiping the nozzle surface with the wiping member to which the cleaning solution is delivered.

The cleaning method further includes other steps as needed.

The cleaning solution is the cleaning solution of the present disclosure.

A cleaning apparatus of the present disclosure is a cleaning apparatus configured to clean a nozzle surface of an ink discharging head and includes:

a unit (hereinafter may be referred to as "cleaning solution delivering unit") configured to deliver a cleaning solution to a wiping member present on a press member; and a unit (hereinafter may be referred to as "wiping unit") configured to wipe the nozzle surface with the wiping member to which the cleaning solution is delivered.

The cleaning apparatus further includes other units as needed.

The cleaning solution is the cleaning solution of the present disclosure.

<Cleaning Solution Delivering Step and Cleaning Solution Delivering Unit>

The press member is not particularly limited and may be appropriately selected depending on the intended purpose so long as the press member is a member capable of pressing the nozzle surface via the wiping member. Examples of the press member include a press roller, a combination of a press roller and a press belt, a wiper, and a blade. Among these press members, a press roller is preferable.

The delivering unit is not particularly limited and may be appropriately selected depending on the intended purpose so long as the delivering unit is capable of delivering the cleaning solution in a regular amount. Examples of the delivering unit include delivery by a dropper, a nozzle, a spray, a dispenser, and a coating machine.

The wiping member is not particularly limited and may be appropriately selected depending on the intended purpose. Examples of the wiping member includes non-woven fabric and cloth. It is preferable that these wiping members be wound up in a roll form. Rolled non-woven fabric is preferable because rolled non-woven fabric has a low dusting property and is highly reliable.

It is preferable to control the amount of the cleaning solution to be delivered depending on the printing time. In this case, it is preferable to select the amount of the cleaning solution to be delivered from a plurality of set values. The plurality of set values may be how to deliver the cleaning solution (e.g., "pressure", "the number of times to deliver", and "the number of delivering nozzles").

It is preferable to control the amount of the cleaning solution to be delivered based on the pressure to be applied to a cleaning solution delivering nozzle, which is the cleaning solution delivering unit. When delivering the cleaning solution from a plurality of cleaning solution delivering nozzles, it is preferable to control the amount of the cleaning solution to be delivered to the wiping member based on the number of the cleaning solution delivering nozzles. It is also preferable to control the amount of the cleaning solution to be delivered to the wiping member based on the number of times to deliver the cleaning solution from the cleaning solution delivering nozzle.

<Wiping Step and Wiping Unit>

The wiping step is a step of wiping a nozzle surface with a wiping member to which a cleaning solution is delivered. The wiping step is performed favorably by the wiping unit.

The method for wiping the nozzle surface with the wiping member to which the cleaning solution is delivered is not particularly limited and may be appropriately selected depending on the intended purpose. Examples of the method include a method of pressing non-woven fabric, which is a wiping member and to which the cleaning solution is delivered, onto the nozzle surface of the ink discharging head with a press roller, which is the press member.

<Other Steps and Other Units>

Examples of the other steps and the other units include a controlling step and a controlling unit.

Examples of the controlling unit include devices such as a sequencer and a computer.

Figure 1:
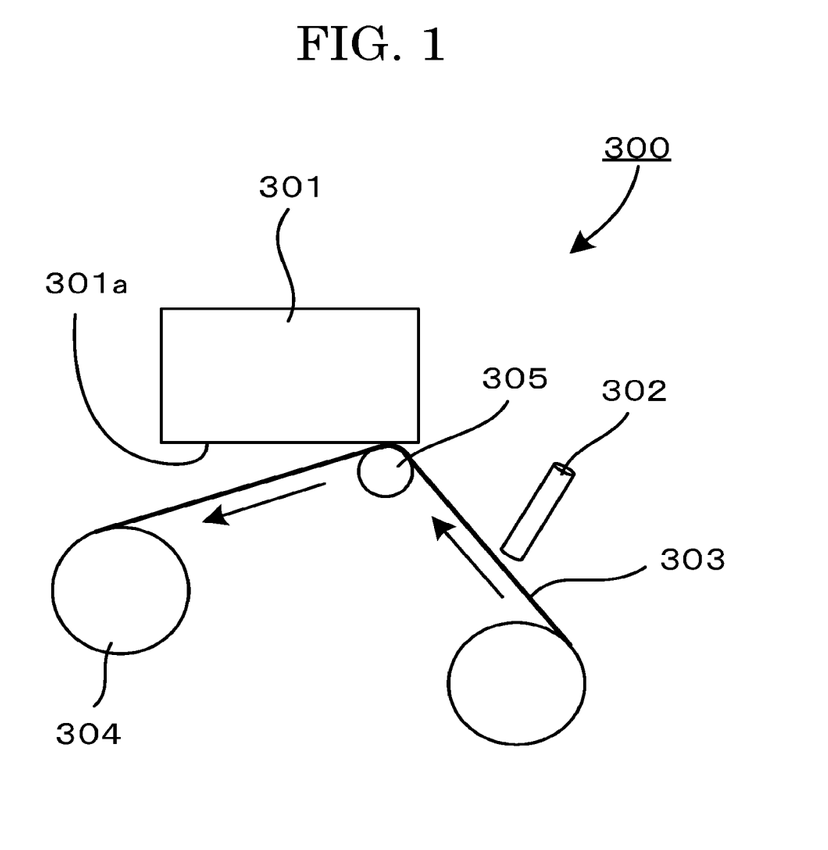
FIG. 1 is a schematic view illustrating an example of a cleaning apparatus of the present disclosure.

FIG. 1 is a schematic view illustrating an example of the cleaning apparatus of the present disclosure. The cleaning apparatus 300 of FIG. 1 is an apparatus configured to clean a nozzle surface 301a of a nozzle plate 301 of an ink discharging head, the nozzle surface 301a being on an ink discharging side of the nozzle plate 301.

The cleaning apparatus 300 includes non-woven fabric 303, which is the wiping member, a cleaning solution delivering nozzle 302, which is the cleaning solution delivering unit, a press roller 305, which is the press member, and a winding roller 304 configured to wind up the non-woven fabric that has been used for a wiping operation.

The cleaning solution is supplied from a cleaning solution tank through an unillustrated cleaning solution supplying tube. By a pump provided halfway through the cleaning solution supplying tube being driven, the cleaning solution is delivered to the non-woven fabric 303, which is the wiping member, from the cleaning solution delivering nozzle 302 in a cleaning solution delivery amount corresponding to a printing time. The non-woven fabric 303 is wound in a roll form.

Then, as illustrated in FIG. 1, the non-woven fabric 303 to which the cleaning solution is delivered is brought into contact with and pressed onto the nozzle surface 301a of the nozzle plate 301 by the press roller 305, which is the press member, to clean the nozzle surface 301a. After the wiping operation is completed, the non-woven fabric 303 is wound up by the winding roller 304.

As the cleaning solution delivering unit, there may be provided a plurality of cleaning solution delivering nozzles 302. The cleaning solution delivering unit is configured to have a pressure applied under control by the controlling unit (unillustrated), and can adjust the amount of the cleaning solution to be delivered by appropriately changing the pressure. The cleaning solution delivering unit can also adjust the amount of the cleaning solution to be delivered by changing the number of nozzles through which to deliver the cleaning solution under control by the controlling unit (unillustrated). The cleaning solution delivering unit can also adjust the amount of the cleaning solution to be delivered by changing the number of times to deliver the cleaning solution under control by the controlling unit (unillustrated).

(Printing Method and Printing Apparatus)

A printing method of the present disclosure includes a discharging step of discharging an ink from a nozzle of an ink discharging head and a cleaning step of cleaning a nozzle surface of the ink discharging head, and further includes other steps as needed.

The cleaning step is performed according to the cleaning method of the present disclosure described above.

A printing apparatus of the present disclosure includes an ink discharging head including a nozzle configured to discharge an ink and a cleaning unit configured to clean a nozzle surface of the ink discharging head, and further includes other units as needed.

The cleaning unit is the cleaning apparatus of the present disclosure.

The ink of the present disclosure can be suitably applied to various printing apparatuses employing an inkjet printing method such as printers, facsimile machines, photocopiers, multifunction peripherals (serving as a printer, a facsimile machine, and a photocopier), and 3D model manufacturing devices (3D printers, additive manufacturing device).

In the present disclosure, the printing apparatus and the printing method represent a device capable of discharging ink, various processing fluids, etc. to a print medium and a method printing an image on the print medium using the device. The print medium means an article to which the ink or the various processing fluids can be attached at least temporarily.

The printing apparatus may further optionally include a device relating to feeding, conveying, and ejecting the print medium and other devices referred to as a pre-processing device, a post-processing device, etc. in addition to the head portion to discharge the ink.

The printing apparatus and the printing method may further optionally include a heater for use in the heating process and a drier for use in the drying process. For example, the heating device and the drying device heat and dry the top surface and the bottom surface of a print medium having an image. The heating device and the drying device are not particularly limited. For example, a fan heater and an infra-red heater can be used. The print medium can be heated and dried before, during, and after printing.

In addition, the printing apparatus and the printing method are not limited to those producing merely meaningful visible images such as texts and figures with the ink. For example, the printing apparatus and the printing method can produce patterns like geometric design and 3D images.

In addition, the printing apparatus includes both a serial type device in which the discharging head is caused to move and a line type device in which the discharging head is not moved, unless otherwise specified.

Furthermore, in addition to the desktop type, this printing apparatus includes a wide type capable of printing images on a large print medium such as A0, a continuous printer capable of using continuous paper wound up in a roll form as print media.

Figure 2:
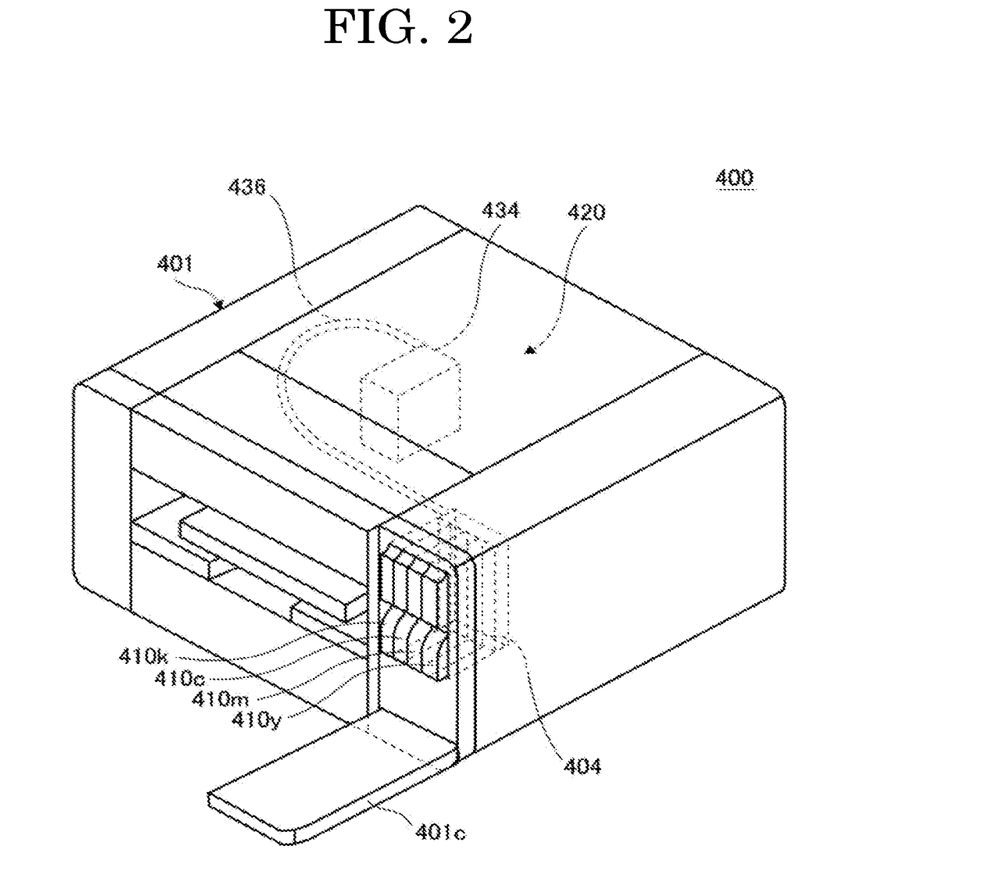
FIG. 2 is a perspective view illustrating an example of a serial-type image forming apparatus.
Figure 3:
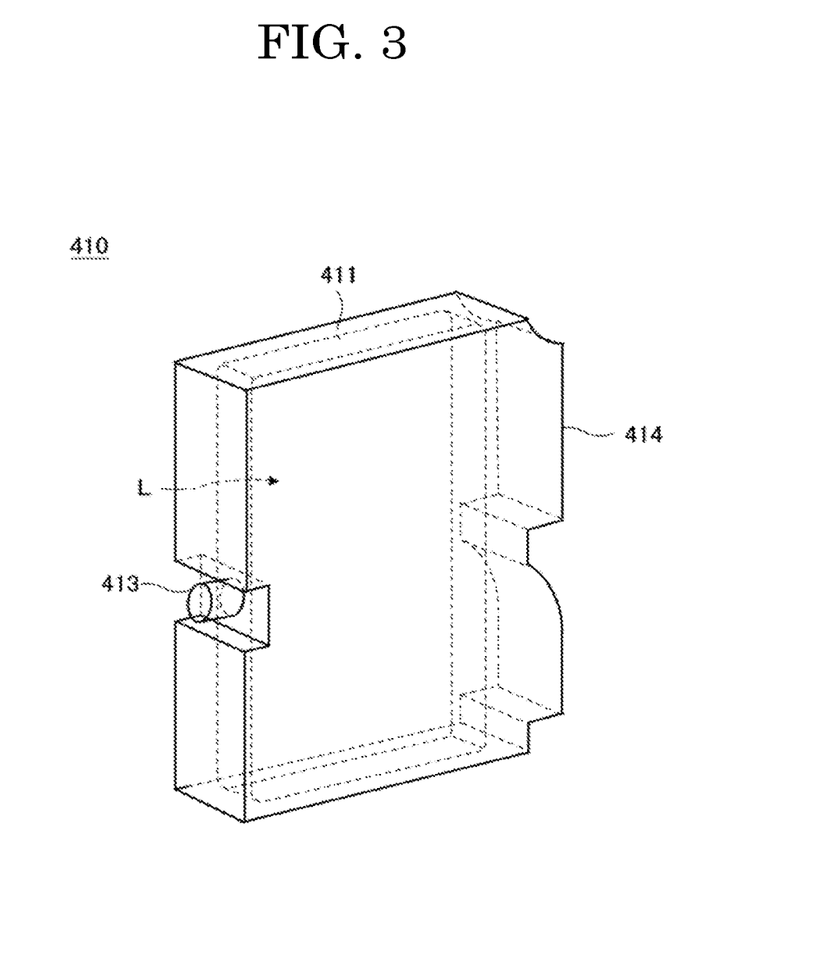
FIG. 3 is a perspective view illustrating an example of a main tank of the apparatus of FIG. 2.

The printing apparatus of the present disclosure is described using an example with reference to FIG. 2 and FIG. 3. FIG. 2 is a perspective view illustrating the image printing apparatus. FIG. 3 is a perspective view illustrating the main tank. An image forming apparatus 400 as an example of the printing apparatus is a serial type image forming apparatus. A mechanical unit 420 is disposed in an exterior 401 of the image forming apparatus 400. Each ink accommodating unit (ink container) 411 of each main tank 410 (410*k*, 410*c*, 410*m*, and 410*y*) for each color of black (K), cyan (C), magenta (M), and yellow (Y) is made of a packing member such as aluminum laminate film. The ink container 411 is accommodated in a plastic housing unit 414. As a result, the main tank 410 is used as an ink cartridge of each color.

A cartridge holder 404 is disposed on the rear side of the opening when a cover 401*c* of the main body is opened. The cartridge holder 404 is detachably attached to the main tank 410. As a result, each ink discharging outlet 413 of the main tank 410 is communicated with a discharging head 434 for each color via a supplying tube 436 for each color so that the ink can be discharged from the discharging head 434 to a print medium.

The applications of the ink of the present disclosure are not particularly limited and can be suitably selected to suit to a particular application. For example, the ink can be used for printed matter, a paint, a coating material, and foundation. The ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink container, a supplying device, and a discharging device, a drier, etc. The three-dimensional solid object includes an object manufactured by re-applying ink. In addition, the three-dimensional solid object can be manufactured by processing a structure having a substrate such as a print medium printed with the ink as a molded processed product. The molded processed product is fabricated by, for example, heating drawing or punching a structure or printed matter having a sheet-like form, film-like form, etc. The molded processed product is suitable for what is molded after surface-decorating. Examples thereof are gauges or operation panels of vehicles, office machines, electric and electronic machines, cameras, etc.

EXAMPLES

The present disclosure will be described more specifically below by way of Examples. However, the present disclosure should not be construed as being limited to the Examples below.

Ink Preparation Example 1

<Preparation of Ink 1>
—Preparation of White Pigment Dispersion—

In a beaker, polyoxyethylene styrenated phenyl ether (NEUGEN EA-177, available from DKS Co., Ltd., HLB=15.6, with a solid concentration of 100 percent by mass) (5 g) was dissolved in highly pure water (200.0 g), and organic white pigment particles (SHIGENOX OWP, available from Hakkor Chemical K.K.) (50.0 g) were added. The materials were stirred with EXCEL AUTO HOMOGENIZER available from Nissei Corporation at 5,000 rpm for 30 minutes until a dispersion state including no blocks was obtained, and stirred for 30 minutes with gradual increase of the rotation speed up until 10,000 rpm.

The obtained organic white pigment particle dispersion liquid was treated with an ultrasonic homogenizer US-300T (with a tip diameter of 26 mm) available from Nissei Corporation under 200 µA for 1 hour while being water-cooled. The obtained organic white pigment particle dispersion liquid was treated with DYNO-MILL MULTILAB TYPE available from Shinmaru Enterprises Corporation using zirconia beads having a diameter of 2 mm as media particles at a beads packing rate of 70 percent by volume, at a stirring blade peripheral velocity of 8 m/s batch-wise for 30 minutes, and subjected to dispersion treatment using NANOMAKER available from Advanced Nanotechnology Limited at a pressure of 100 MPa for 20 passes.

Subsequently, the resultant was filtrated through a membrane filter (cellulose acetate film) having an average pore diameter of 5 µm, to obtain an organic white pigment particle dispersion containing organic white pigment particles in an amount of 19.6 percent by mass.

Subsequently, 1,3-butanediol (15.0 percent by mass), 1,2-propanediol (15.0 percent by mass), an acrylic resin emulsion (product name: BONCOAT R-3380-E, available from DIC Corporation, with a solid concentration of 45 percent by mass) (6.7 percent by mass) (solid concentration: 3 percent by mass), and a fluorosurfactant (product name: ZONYL (registered trademark) FSO-100, available from DuPont Kabushiki Kaisha) (1.0 percent by mass) were added together and stirred and mixed. Subsequently, the organic white pigment particle dispersion (20.0 percent by mass) and ion-exchanged water (balance) were added, and the materials were stirred for 1 hour.

Subsequently, the resultant was subjected to pressure filtration through a polypropylene filter having an average pore diameter of 1.5 μm to remove coarse particles, to prepare an ink 1

Ink Preparation Example 2

—Preparation of Ink 2—

An ink 2 was prepared in the same manner as in Ink preparation example 1, except that the proportion of the acrylic resin emulsion (available from DIC Corporation, product name: BONCOAT R-3380-E, with a solid concentration of 45 percent by mass) used in Ink preparation example 1 was changed to 11.1 percent by mass (solid concentration: 5 percent by mass).

Ink Preparation Example 3

—Preparation of Ink 3—

An ink 3 was prepared in the same manner as in Ink preparation example 1, except that the proportion of the organic white pigment particle dispersion used in Ink preparation example 1 was changed to 30 percent by mass and the proportion of the acrylic resin emulsion (available from DIC Corporation, product name: BONCOAT R-3380-E, with a solid concentration of 45 percent by mass) used in Ink preparation example 1 was changed to 17.8 percent by mass (solid concentration: 8 percent by mass).

Ink Preparation Example 4

As an ink 4, LX100/LX101 LATEX INK CARTRIDGE WHITE INK (available from Mimaki Engineering Co., Ltd., product number: LX100-W-22), which was a resin-containing ink, was obtained.

Ink Preparation Example 5

As an ink 5, HP 831B 775-ML MAGENTA LATEX INK CARTRIDGE (available from HP Company, product number: CZ690A), which was a resin-containing ink, was obtained.

TABLE 1

| Component (percent by mass) | | Ink 1 | Ink 2 | Ink 3 |
|---|---|---|---|---|
| Solvent | 1,3-butanediol | 15 | 15 | 15 |
| | 1,2-propanediol | 15 | 15 | 15 |
| Resin | Acrylic resin emulsion | 3 | 5 | 8 |
| Pigment dispersion | Organic white pigment particle dispersion | 20 | 20 | 30 |
| Surfactant | FSO-100 | 1 | 1 | 1 |
| Water | Ion-exchanged water | Balance | Balance | Balance |
| Total (percent by mass) | | 100 | 100 | 100 |

*In Table 1, the proportion of the acrylic resin emulsion was a solid concentration equivalent.

The product names and supplier names of the components presented in Table 1 are as follows.

1,3-Butanediol: available from Tokyo Chemical Industry Co., Ltd.

1,2-Propanediol: available from Mitsui Chemicals Inc.

Acrylic resin emulsion: available from DIC Corporation, product name: BONCOAT R-3380-E, with a solid concentration of 45 percent by mass Surfactant: available from DuPont Kabushiki Kaisha, product name: ZONYL (registered trademark) FSO-100

Examples 1 to 14 and Comparative Examples 1 to 7

<Preparation of Cleaning Solutions 1 to 16>

According to the compositions and proportions presented in Table 2 to Table 5 below, the respective components were mixed in the descending order, to prepare cleaning solutions 1 to 16.

<Preparation of Cleaning Solution 17>

As a cleaning solution 17, a commercially available product MIMAKI 01 (available from Mimaki Engineering Co., Ltd.) was used. The composition and proportion of the cleaning solution 17 are presented in Table 5.

TABLE 2

| | | Cleaning solution 1 | Cleaning solution 2 | Cleaning solution 3 | Cleaning solution 4 | Cleaning solution 5 |
|---|---|---|---|---|---|---|
| Solvent | Diethylene glycol monobutyl ether | 20 | 20 | — | — | — |
| | Diethylene glycol diethyl ether | — | — | 20 | — | — |
| | Triethylene glycol monobutyl ether | — | — | — | 20 | — |
| | Tripropylene glycol monomethyl ether | — | — | — | — | 20 |
| | 2-pyrrolidone | — | — | — | — | — |
| | 2,2,4-trimethyl-1,3-pentanediol | — | — | — | — | — |
| | 2-ethyl-1,3-hexanediol | — | — | — | — | — |
| Surfactant | LS-106 | — | 1 | 1 | 1 | 1 |
| | WET-240 | — | — | — | — | — |
| | BYK-349 | — | — | — | — | — |
| Water | Ion-exchanged water | 80 | 79 | 79 | 79 | 79 |
| Total (percent by mass) | | 100 | 100 | 100 | 100 | 100 |

TABLE 3

| | | Cleaning solution 6 | Cleaning solution 7 | Cleaning solution 8 | Cleaning solution 9 | Cleaning solution 10 |
|---|---|---|---|---|---|---|
| Solvent | Diethylene glycol monobutyl ether | 30 | 70 | 35 | 35 | 35 |
| | Diethylene glycol diethyl ether | — | — | — | — | — |
| | Triethylene glycol monobutyl ether | — | — | — | — | — |
| | Tripropylene glycol monomethyl ether | — | — | — | — | — |
| | 2-pyrrolidone | — | — | — | — | — |

TABLE 3-continued

|  |  | Cleaning solution 6 | Cleaning solution 7 | Cleaning solution 8 | Cleaning solution 9 | Cleaning solution 10 |
|---|---|---|---|---|---|---|
|  | 2,2,4-trimethyl-1,3-pentanediol | — | — | 10 | — | — |
|  | 2-ethyl-1,3-hexanediol | — | — | — | 10 | — |
| Surfactant | LS-106 | 1 | 1 | 1 | 1 | — |
|  | WET-240 | — | — | — | — | 1 |
|  | BYK-349 | — | — | — | — | — |
| Water | Ion-exchanged water | 69 | 29 | 54 | 54 | 54 |
|  | Total (percent by mass) | 100 | 100 | 100 | 100 | 100 |

TABLE 4

|  |  | Cleaning solution 11 | Cleaning solution 12 | Cleaning solution 13 | Cleaning solution 14 | Cleaning solution 15 |
|---|---|---|---|---|---|---|
| Solvent | Diethylene glycol monobutyl ether | 35 | 15 | 70 | 85 | — |
|  | Diethylene glycol diethyl ether | — | — | — | — | — |
|  | Triethylene glycol monobutyl ether | — | — | — | — | — |
|  | Tripropylene glycol monomethyl ether | — | — | — | — | — |
|  | 2-pyrrolidone | — | — | — | — | 35 |
|  | 2,2,4-trimethyl-1,3-pentanediol | — | — | — | — | — |
|  | 2-ethyl-1,3-hexanediol | — | — | — | — | — |
| Surfactant | LS-106 | — | 1 | 1 | 1 | 1 |
|  | WET-240 | — | — | — | — | — |
|  | BYK-349 | — | — | — | — | — |
| Water | Ion-exchanged water | 65 | 84 | 29 | 14 | 64 |
|  | Total (percent by mass) | 100 | 100 | 100 | 100 | 100 |

TABLE 5

|  |  | Cleaning solution 16 | Cleaning solution 17 |
|---|---|---|---|
| Solvent | Diethylene glycol monobutyl ether | 99 | — |
|  | Diethylene glycol diethyl ether | — | — |
|  | Triethylene glycol monobutyl ether | — | — |
|  | Tripropylene glycol monomethyl ether | — | — |
|  | 2-pyrrolidone | — | — |
|  | 2,2,4-trimethyl-1,3-pentanediol | — | — |
|  | 2-ethyl-1,3-hexanediol | — | 80 |
| Surfactant | LS-106 | 1 | 1 |
|  | WET-240 | — | — |
|  | BYK-349 | — | — |
| Water | Ion-exchanged water | — | 19 |
|  | Total (percent by mass) | 100 | 100 |

The product names and supplier names of the components presented in Table 2 to Table 5 are as follows.

<Solvent>
Diethylene glycol monobutyl ether (available from Tokyo Chemical Industry Co, Ltd.)
Diethylene glycol diethyl ether (available from Tokyo Chemical Industry Co, Ltd.)
Triethylene glycol monobutyl ether (available from Tokyo Chemical Industry Co., Ltd.)
Tripropylene glycol monomethyl ether (available from Tokyo Chemical Industry Co., Ltd.)
2-Pyrrolidone (available from Tokyo Chemical Industry Co., Ltd.)
2,2,4-Trimethyl-1,3-pentanediol (available from Wako Pure Chemical Industries, Ltd.)
2-Ethyl-1,3-hexanediol (available from Tokyo Chemical Industry Co., Ltd.)

<Surfactant>
LS-106 (available from Kao Corporation), higher alcohol-based ether-based nonionic surfactant
WET-240 (available from Nissin Chemical Industry Co., Ltd.), silicone-based surfactant
BYK-349 (available from Byk-Chemie Japan Co., Ltd.), silicone-based surfactant Next, the inks and the cleaning solutions were combined as presented in Table 6 below, to obtain sets of an ink and a cleaning solution of Examples 1 to 14 and Comparative Examples 1 to 7.

Using the obtained sets of an ink and a cleaning solution, various properties were evaluated in the manners described below. The results are presented in Table 6.

<Swelling Ratio>

The ink was dropped into a Teflon (registered trademark) petri dish (with a diameter of 30 mm) and dried in a thermostat bath of 50 degrees C. for 1 day, to produce an ink film having an average thickness after dried of 1 mm.

The produced ink film was cut out into a size of 5 mm×5 mm, and then the mass of the cut-out ink film was measured. The cut-out ink film was put in a 5 mL glass bottle, and the cleaning solution (1 g) was poured into the glass bottle to immerse the ink film. The ink film was left to stand in the glass bottle in a hermetically sealed state at 25 degrees C. for 24 hours.

After left to stand at 25 degrees C. for 24 hours, the ink film was taken out from the glass bottle, and the surface of the ink film was wiped with KIMWIPES (available from Nippon Paper Crecia Co., Ltd.) to a degree that the cleaning solution on the surface could no longer be visually recognized. Then, the mass of the ink film was measured. The swelling ratio was calculated according to mathematical formula 1 below.

Swelling ratio(%)=100×[(B−A)/A]  Mathematical formula 1

In mathematical formula 1, A represents the mass of the ink film before immersed, and B represents the mass of the ink film after immersed.

<Discharging Reliability>

With the printer illustrated in FIG. 1, the ink included in each set of an ink and a cleaning solution presented in Table 6 was discharged continuously for 45 minutes, and then the nozzle surface of the discharging head was dried for 30 minutes after the discharging was stopped. Subsequently, each cleaning solution (3 mL) was delivered to ANTICON (CLEAN WIPER ANTICON GOLD, polyester filament fiber) with a dropper, and the nozzle surface was wiped. Subsequently, the ink was discharged again, to evaluate "discharging reliability" according to criteria described below.

[Evaluation Criteria]

A: Discharging disorder or no discharging was not observed at all.

B: Discharging disorder or no discharging was observed in 2 or less nozzles, but was overcome soon.

C: Discharging disorder or no discharging was observed in more than 2 but 5 or less nozzles, but was overcome soon.

D: Discharging disorder or no discharging was observed in more than 2 but 5 or less nozzles.

E: Discharging disorder or no discharging was observed in more than 5 nozzles.

<Ink Fixability>

An inkjet printer (IPSIO GX5000, available from Ricoh Company, Ltd.) was loaded with the ink included in each set of an ink and a cleaning solution presented in Table 6 to perform printing on TYPE 6200 PAPER (available from NBS Ricoh Co., Ltd.) at a resolution of 600 dpi.

Subsequently, a filter paper was pressed on the printed portion to visually observe the degree of transfer to the filter paper and evaluate "ink fixability" according to criterial described below.

[Evaluation Criteria]

A: No transfer of the pigment to the filter paper was observed at all.

B: No transfer of the pigment to the filter paper was observed.

C: Transfer of the pigment was observed at some parts.

D: Transfer of the pigment was observed at most parts.

Aspects of the present disclosure are as follows, for example.

<1> A cleaning solution used for cleaning an ink including water and a resin, the cleaning solution including:

water; and a solvent, wherein the solvent includes a glycol ether compound represented by general formula 1 below, and wherein an ink film obtained by drying the ink has a swelling ratio of 20 percent or higher but 150 percent or lower, where the swelling ratio is calculated according to mathematical formula 1 below based on masses of the ink film before and after the ink film is immersed in the cleaning solution at 25 degrees C. for 24 hours, $$R^1(OR^2)_XOR^3 \quad \text{General formula 1}$$

where in general formula 1, $R^1$ and $R^3$ represent any one of a hydrogen atom and an alkyl group including from 1 through 4 carbon atoms, $R^2$ represents an alkyl group including from 2 through 3 carbon atoms, and X represents an integer of from 1 through 4, $$\text{Swelling ratio}(\%) = 100 \times [(B-A)/A] \quad \text{Mathematical formula 1}$$

where in mathematical formula 1, A represents a mass of the ink film before immersed, and B represents a mass of the ink film after immersed.

<2> The cleaning solution according to <1>, wherein the glycol ether compound represented by general formula 1 is at least one selected from the group consisting of diethylene glycol monobutyl ether, diethylene glycol diethyl ether, triethylene glycol monobutyl ether, and tripropylene glycol monomethyl ether.

<3> The cleaning solution according to <1> or <2>, wherein a proportion of the glycol ether compound represented by general formula 1 in the cleaning solution is 30 percent by mass or greater but 70 percent by mass or less.

<4> The cleaning solution according to any one of <1> to <3>, wherein a proportion of the glycol ether compound represented by general formula 1 in the cleaning solution is 45 percent by mass or greater but 60 percent by mass or less.

<5> The cleaning solution according to any one of <1> to <4>, further including a surfactant.

TABLE 6

| | Cleaning solution No. | Ink No. | Swelling ratio (percent) | Discharging reliability | Ink fixability |
|---|---|---|---|---|---|
| Ex. 1 | Cleaning solution 1 | Ink 1 | 22 | C | B |
| Ex. 2 | Cleaning solution 2 | Ink 1 | 30 | B | B |
| Ex. 3 | Cleaning solution 3 | Ink 1 | 25 | B | B |
| Ex. 4 | Cleaning solution 4 | Ink 4 | 20 | B | B |
| Ex. 5 | Cleaning solution 5 | Ink 5 | 32 | B | B |
| Ex. 6 | Cleaning solution 6 | Ink 1 | 58 | A | B |
| Ex. 7 | Cleaning solution 7 | Ink 1 | 149 | A | B |
| Ex. 8 | Cleaning solution 8 | Ink 1 | 82 | A | B |
| Ex. 9 | Cleaning solution 9 | Ink 1 | 85 | A | B |
| Ex. 10 | Cleaning solution 10 | Ink 1 | 80 | A | B |
| Ex. 11 | Cleaning solution 11 | Ink 1 | 75 | A | B |
| Ex. 12 | Cleaning solution 2 | Ink 2 | 20 | C | A |
| Ex. 13 | Cleaning solution 6 | Ink 2 | 40 | B | A |
| Ex. 14 | Cleaning solution 6 | Ink 3 | 45 | C | A |
| Comp. Ex. 1 | Cleaning solution 12 | Ink 1 | 15 | D | B |
| Comp. Ex. 2 | Cleaning solution 13 | Ink 1 | 162 | D | B |
| Comp. Ex. 3 | Cleaning solution 14 | Ink 1 | Dissolved/dispersed | D | B |
| Comp. Ex. 4 | Cleaning solution 15 | Ink 1 | 23 | D | B |
| Comp. Ex. 5 | Cleaning solution 12 | Ink 2 | 10 | E | A |
| Comp. Ex. 6 | Cleaning solution 16 | Ink 1 | 48 | E | B |
| Comp. Ex. 7 | Cleaning solution 17 | Ink 1 | Dissolved/dispersed | D | B |

<6> The cleaning solution according to <5>,
wherein the surfactant is a silicone-based surfactant.
<7> The cleaning solution according to <6>,
wherein the silicone-based surfactant is a polyether-modified silicone-based surfactant.
<8> The cleaning solution according to any one of <1> to <7>, further including
a polyol compound including from 8 through 11 carbon atoms.
<9> The cleaning solution according to <8>,
wherein the polyol compound including from 8 through 11 carbon atoms is any one of 2-ethyl-1,3-hexanediol and 2,2,4-trimethyl-1,3-pentanediol.
<10> The cleaning solution according to any one of <1> to <9>,
wherein a proportion of the resin in the ink is 5 percent by mass or greater.
<11> The cleaning solution according to any one of <1> to <10>,
wherein a proportion of the resin in the ink is 5 percent by mass or greater but 30 percent by mass or less.
<12> A set of an ink and a cleaning solution, the set including:
an ink; and
a cleaning solution,
wherein the ink includes:
water; and
a resin,
wherein the cleaning solution includes:
water; and
a solvent,
wherein the solvent includes a glycol ether compound represented by general formula 1 below, and
wherein an ink film obtained by drying the ink has a swelling ratio of 20 percent or higher but 150 percent or lower, where the swelling ratio is calculated according to mathematical formula 1 below based on masses of the ink film before and after the ink film is immersed in the cleaning solution at 25 degrees C. for 24 hours, $$R^1(OR^2)_XOR^3 \qquad \text{General formula 1}$$

where in general formula 1, $R^1$ and $R^3$ represent any one of a hydrogen atom and an alkyl group including from 1 through 4 carbon atoms, $R^2$ represents an alkyl group including from 2 through 3 carbon atoms, and X represents an integer of from 1 through 4, $$\text{Swelling ratio(\%)}=100\times[(B-A)/A] \qquad \text{Mathematical formula 1}$$

where in mathematical formula 1, A represents a mass of the ink film before immersed, and B represents a mass of the ink film after immersed.
<13> The set of an ink and a cleaning solution according to <12>,
wherein the glycol ether compound represented by general formula 1 is at least one selected from the group consisting of diethylene glycol monobutyl ether, diethylene glycol diethyl ether, triethylene glycol monobutyl ether, and tripropylene glycol monomethyl ether.
<14> The set of an ink and a cleaning solution according to <12> or <13>,
wherein a proportion of the glycol ether compound represented by general formula 1 in the cleaning solution is 30 percent by mass or greater but 70 percent by mass or less.
<15> The set of an ink and a cleaning solution according to any one of <12> to <14>,
wherein a proportion of the glycol ether compound represented by general formula 1 in the cleaning solution is 45 percent by mass or greater but 60 percent by mass or less.
<16> The set of an ink and a cleaning solution according to any one of <12> to <15>,
wherein the cleaning solution further includes a surfactant.
<17> The set of an ink and a cleaning solution according to <16>,
wherein the surfactant is a silicone-based surfactant.
<18> The set of an ink and a cleaning solution according to <17>,
wherein the silicone-based surfactant is a polyether-modified silicone-based surfactant.
<19> The set of an ink and a cleaning solution according to any one of <12> to <18>,
wherein the cleaning solution further includes a polyol compound including from 8 through 11 carbon atoms.
<20> The set of an ink and a cleaning solution according to <19>,
wherein the polyol compound including from 8 through 11 carbon atoms is any one of 2-ethyl-1,3-hexanediol and 2,2,4-trimethyl-1,3-pentanediol.
<21> The set of an ink and a cleaning solution according to any one of <12> to <20>,
wherein a proportion of the resin in the ink is 5 percent by mass or greater.
<22> The set of an ink and a cleaning solution according to any one of <12> to <21>,
wherein a proportion of the resin in the ink is 5 percent by mass or greater but 30 percent by mass or less.
<23> A cleaning method for cleaning a nozzle surface of an ink discharging head, the cleaning method including:
a step of delivering a cleaning solution to a wiping member present on a press member; and
a step of wiping the nozzle surface with the wiping member to which the cleaning solution is delivered,
wherein the cleaning solution is the cleaning solution according to any one of <1> to <11>.
<24> A printing method including:
a discharging step of discharging an ink from a nozzle of an ink discharging head; and
a cleaning step of cleaning a nozzle surface of the ink discharging head, wherein the cleaning step is performed according to the cleaning method according to <23>.
<25> A cleaning apparatus configured to clean a nozzle surface of an ink discharging head, the cleaning apparatus including:
a unit configured to deliver a cleaning solution to a wiping member present on a press member; and
a unit configured to wipe the nozzle surface with the wiping member to which the cleaning solution is delivered,
wherein the cleaning solution is the cleaning solution according to any one of <1> to <11>.
<26> A printing apparatus including:
an ink discharging head including a nozzle configured to discharge an ink; and
a cleaning unit configured to clean a nozzle surface of the ink discharging head,
wherein the cleaning unit is the cleaning apparatus according to <25>.

The cleaning solution according to any one of <1> to <11>, the set of an ink and a cleaning solution according to any one of <12> to <22>, the cleaning method according to <23>, the printing method according to <24>, the cleaning apparatus according to <25>, and the printing apparatus

What is claimed is:

1. A cleaning solution used for cleaning an ink that comprises water and a resin, the cleaning solution comprising:
   water; and
   a solvent,
   wherein the solvent comprises a glycol ether compound represented by general formula 1 below, and
   wherein an ink film obtained by drying the ink has a swelling ratio of 20 percent or higher but 150 percent or lower, where the swelling ratio is calculated according to mathematical formula 1 below based on masses of the ink film before and after the ink film is immersed in the cleaning solution at 25 degrees C. for 24 hours, $$R^1(OR^2)_XOR^3 \qquad \text{General formula 1}$$

where in general formula 1, $R^1$ and $R^3$ represent any one of a hydrogen atom and an alkyl group that comprises from 1 through 4 carbon atoms, $R^2$ represents an alkyl group that comprises from 2 through 3 carbon atoms, and X represents an integer of from 1 through 4, $$\text{Swelling ratio(\%)}=100\times[(B-A)/A] \qquad \text{Mathematical formula 1}$$

where in mathematical formula 1, A represents a mass of the ink film before immersed, and B represents a mass of the ink film after immersed.

2. The cleaning solution according to claim 1,
   wherein a proportion of the glycol ether compound represented by general formula 1 in the cleaning solution is 30 percent by mass or greater but 70 percent by mass or less.

3. The cleaning solution according to claim 1, further comprising a surfactant.

4. The cleaning solution according to claim 3,
   wherein the surfactant comprises a silicone-based surfactant.

5. The cleaning solution according to claim 1, further comprising a polyol compound that comprises from 8 through 11 carbon atoms.

6. The cleaning solution according to claim 1,
   wherein a proportion of the resin in the ink is 5 percent by mass or greater.

7. A set of an ink and a cleaning solution, the set comprising:
   an ink; and
   a cleaning solution,
   wherein the ink comprises:
      water; and
      a resin,
   wherein the cleaning solution comprises:
      water; and
      a solvent,
      wherein the solvent comprises a glycol ether compound represented by general formula 1 below, and
      wherein an ink film obtained by drying the ink has a swelling ratio of 20 percent or higher but 150 percent or lower, where the swelling ratio is calculated according to mathematical formula 1 below based on masses of the ink film before and after the ink film is immersed in the cleaning solution at 25 degrees C. for 24 hours, $$R^1(OR^2)_XOR^3 \qquad \text{General formula 1}$$

where in general formula 1, $R^1$ and $R^3$ represent any one of a hydrogen atom and an alkyl group that comprises from 1 through 4 carbon atoms, $R^2$ represents an alkyl group that comprises from 2 through 3 carbon atoms, and X represents an integer of from 1 through 4, $$\text{Swelling ratio(\%)}=100\times[(B-A)/A] \qquad \text{Mathematical formula 1}$$

where in mathematical formula 1, A represents a mass of the ink film before immersed, and B represents a mass of the ink film after immersed.

8. A cleaning method for cleaning a nozzle surface of an ink discharging head, the cleaning method comprising:
   delivering a cleaning solution to a wiping member present on a press member; and
   wiping the nozzle surface with the wiping member to which the cleaning solution is delivered,
   wherein the cleaning solution comprises the cleaning solution according to claim 1.

9. A printing method comprising:
   discharging an ink from a nozzle of an ink discharging head; and
   cleaning a nozzle surface of the ink discharging head,
   wherein the cleaning is performed according to the cleaning method according to claim 8.

10. A cleaning apparatus configured to clean a nozzle surface of an ink discharging head, the cleaning apparatus comprising:
    a unit configured to deliver a cleaning solution to a wiping member present on a press member; and
    a unit configured to wipe the nozzle surface with the wiping member to which the cleaning solution is delivered,
    wherein the cleaning solution is a cleaning solution used for cleaning an ink that comprises water and a resin, and
    wherein the cleaning solution comprises:
       water; and
       a solvent,
       wherein the solvent comprises a glycol ether compound represented by general formula 1 below, and
       wherein an ink film obtained by drying the ink has a swelling ratio of 20 percent or higher but 150 percent or lower, where the swelling ratio is calculated according to mathematical formula 1 below based on masses of the ink film before and after the ink film is immersed in the cleaning solution at 25 degrees C. for 24 hours, $$R^1(OR^2)_XOR^3 \qquad \text{General formula 1}$$

where in general formula 1, $R^1$ and $R^3$ represent any one of a hydrogen atom and an alkyl group that comprises from 1 through 4 carbon atoms, $R^2$ represents an alkyl group that comprises from 2 through 3 carbon atoms, and X represents an integer of from 1 through 4, $$\text{Swelling ratio(\%)}=100\times[(B-A)/A] \qquad \text{Mathematical formula 1}$$

where in mathematical formula 1, A represents a mass of the ink film before immersed, and B represents a mass of the ink film after immersed.

11. A printing apparatus comprising:
    an ink discharging head that comprises a nozzle configured to discharge an ink; and
    a cleaning unit configured to clean a nozzle surface of the ink discharging head,
    wherein the cleaning unit comprises the cleaning apparatus according to claim 10.

* * * * *